(12) United States Patent
Ma et al.

(10) Patent No.: US 11,178,352 B2
(45) Date of Patent: Nov. 16, 2021

(54) IMAGING SYSTEM

(71) Applicant: SZ DJI TECHNOLOGY CO., LTD., Shenzhen (CN)

(72) Inventors: Junping Ma, Shenzhen (CN); Qiang Zhang, Shenzhen (CN); Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/023,066

(22) Filed: Sep. 16, 2020

(65) Prior Publication Data

US 2020/0412996 A1 Dec. 31, 2020

Related U.S. Application Data

(63) Continuation of application No. PCT/CN2018/080246, filed on Mar. 23, 2018.

(51) Int. Cl.
*H04N 5/38* (2006.01)
*B64C 39/02* (2006.01)
(Continued)

(52) U.S. Cl.
CPC ............. *H04N 5/38* (2013.01); *B64C 39/024* (2013.01); *B64D 47/08* (2013.01); *H04N 5/2253* (2013.01);
(Continued)

(58) Field of Classification Search
None
See application file for complete search history.

(56) References Cited

U.S. PATENT DOCUMENTS

2012/0276844 A1* 11/2012 Goossen ............. H04N 5/2253
455/41.1
2017/0291719 A1* 10/2017 Lavine ................... B64D 47/08
(Continued)

FOREIGN PATENT DOCUMENTS

CN 101493699 A 7/2009
CN 104380725 A 2/2015
(Continued)

OTHER PUBLICATIONS

The World Intellectual Property Organization (WIPO) International Search Report for PCT/CN2018/080246 dated Dec. 5, 2018 6 pages.

*Primary Examiner* — Heather R Jones
(74) *Attorney, Agent, or Firm* — Anova Law Group, PLLC

(57) ABSTRACT

An imaging system includes a body, a first processing circuit provided at the body, a gimbal carried by the body, an image collection circuit carried by the gimbal, a second processing circuit provided at the gimbal, a third processing circuit provided at the body, and a signal transmission line. One end of the signal transmission line is connected to the second processing circuit, and another end of the signal transmission line is connected to the third processing circuit. The second processing circuit is configured to encode a multi-channel first signal output by the image collection circuit to output a second signal. The third processing circuit is configured to receive the second signal through the signal transmission line, decode the second signal to obtain a decoded second signal, and transmit the decoded second signal to the first processing circuit.

17 Claims, 3 Drawing Sheets

(51) Int. Cl.
*B64D 47/08* (2006.01)
*H04N 5/225* (2006.01)
*H04N 5/232* (2006.01)
*H04N 7/12* (2006.01)

(52) U.S. Cl.
CPC ........... *H04N 5/23229* (2013.01); *H04N 7/12* (2013.01); *B64C 2201/127* (2013.01); *H04N 5/23203* (2013.01)

(56) References Cited

U.S. PATENT DOCUMENTS

2017/0359499 A1* 12/2017 Thanigasalam ........... G06F 8/65
2020/0280698 A1* 9/2020 Liu .................... H04N 5/23229

FOREIGN PATENT DOCUMENTS

| CN | 105100728 | A | | 11/2015 | |
|---|---|---|---|---|---|
| CN | 205029788 | U | | 2/2016 | |
| CN | 205142277 | U | | 4/2016 | |
| CN | 205265836 | U | | 5/2016 | |
| CN | 205469862 | U | * | 8/2016 | ............ B64D 47/08 |
| CN | 205469862 | U | | 8/2016 | |
| CN | 205565057 | U | | 9/2016 | |
| CN | 106060469 | A | | 10/2016 | |
| CN | 205931243 | U | | 2/2017 | |
| CN | 106657884 | A | | 5/2017 | |
| CN | 106688233 | A | | 5/2017 | |
| CN | 107005687 | A | | 8/2017 | |
| CN | 107113406 | A | | 8/2017 | |
| EP | 2341387 | A1 | | 7/2011 | |

* cited by examiner

IMAGING SYSTEM

CROSS-REFERENCE TO RELATED APPLICATION

This application is a continuation of International Application No. PCT/CN2018/080246, filed Mar. 23, 2018, the entire content of which is incorporated herein by reference.

TECHNICAL FIELD

The present disclosure generally relates to an imaging field and, more particularly, to an imaging system.

BACKGROUND

With a small unmanned aerial vehicle (UAV), aerial photographing becomes easy to realize. Thus, the unmanned aerial photographing gains rapid popularity. A camera cannot be directly placed on a UAV body through a hard connection. The reason is that, during a flight of the UAV, vibration of the UAV body caused by rotation of a propeller, and drifting of the UAV body caused by UAV's lifting and landing, steering, and an external force may cause the camera to shake. Therefore, a photographed image may be unstable, and photographing quality may be poor. Thus, the camera needs to be placed on the UAV body through a gimbal. The gimbal may compensate for the vibration of the UAV to reduce vibration and improve stabilization.

The gimbal may compensate for the vibration of the UAV through power of an electrical motor. The lighter the camera placed on the gimbal is, the easier the gimbal design is. Therefore, to reduce the weight of the gimbal, only essential components such as an image sensor, a lens, etc., are placed on the gimbal for the small UAV. Then, image data output by the camera is directly transmitted to the UAV through a signal transmission line. Since data output by the image sensor is large, the signal transmission line with a plurality of channels is needed to transmit the data collected by the image sensor to the UAV. The signal transmission line with the plurality of channels not only limits the rotation of the gimbal and view finding but also increases cost.

SUMMARY

Embodiments of the present disclosure provide an imaging system, including a body, a first processing circuit provided at the body, a gimbal carried by the body, an image collection circuit carried by the gimbal, a second processing circuit provided at the gimbal, a third processing circuit provided at the body, and a signal transmission line. One end of the signal transmission line is connected to the second processing circuit, and another end of the signal transmission line is connected to the third processing circuit. The second processing circuit is configured to encode a multi-channel first signal output by the image collection circuit to output a second signal. The third processing circuit is configured to receive the second signal through the signal transmission line, decode the second signal to obtain a decoded second signal, and transmit the decoded second signal to the first processing circuit.

REFERENCE NUMERALS

1 Body 11 First processing circuit 2 Gimbal 3 Image collection circuit 4 Signal transmission line 5 Second processing circuit 6 Third processing circuit

DETAILED DESCRIPTION OF THE EMBODIMENTS

A technical solution of embodiments of the present disclosure is described in connection with accompanying drawings of embodiments of the present disclosure. Described embodiments are merely some embodiments of the present disclosure, not all the embodiments. Based on the described embodiments, all other embodiments obtained by those of ordinary skill in the art without creative efforts are within the scope of the present disclosure.

Figure 1:
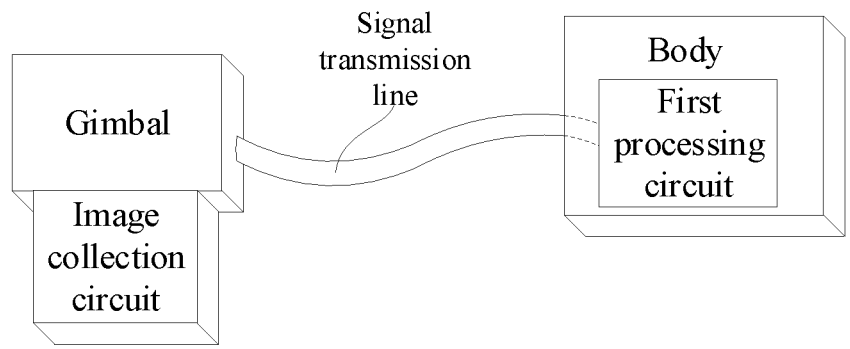
FIG. 1 is a schematic structural diagram showing an imaging system.
Figure 2:
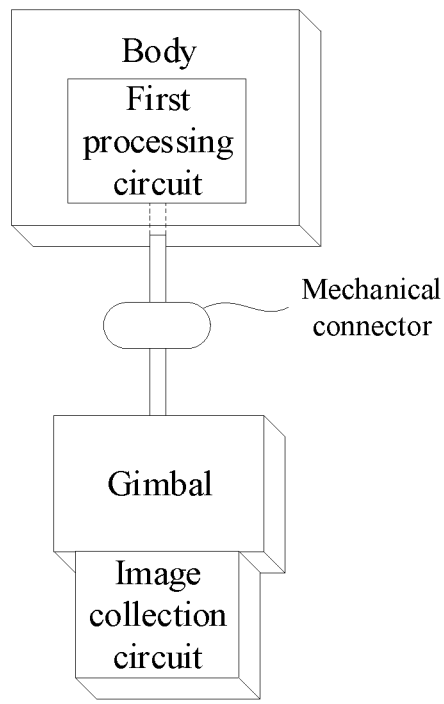
FIG. 2 is a schematic structural diagram showing another imaging system.

An imaging system of the present disclosure is described in connection with the accompanying drawings. Without conflict, features of embodiments may be combined with each other. FIG. 1 schematically shows an example imaging system including a gimbal and a body coupled to each other through a signal transmission line. The body includes a first processing circuit, and the gimbal carries an image collection circuit. FIG. 2 schematically shows another example imaging system. The imaging system shown in FIG. 2 differs from that shown in FIG. 1 in that, in the imaging system of FIG. 2, the body and the gimbal are coupled to either other through a mechanical connector.

Figure 3:
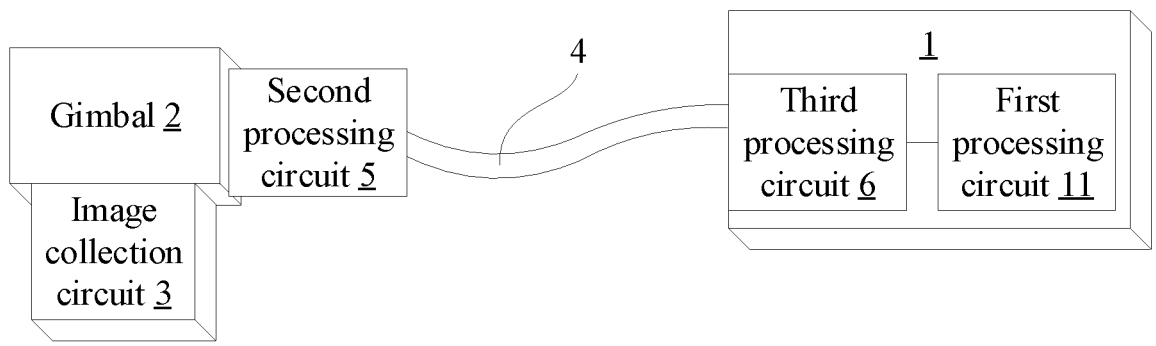
FIG. 3 is a schematic structural diagram showing an imaging system according to some embodiments of the present disclosure.

FIG. 3 shows an example imaging system consistent with the disclosure. The imaging system includes a body 1, a first processing circuit 11, a gimbal 2, an image collection circuit 3, a signal transmission line 4, a second processing circuit 5, and a third processing circuit 6. The first processing circuit 11 is provided at the body 1. Optionally, the first processing circuit 11 may be provided inside the body 1 or outside the body 1. The gimbal 2 is carried by the body 1. Optionally, the gimbal 2 may be carried by the body 1 in a hang-up manner or hang-down manner. The image collection circuit 3 is carried by the gimbal 2. In some embodiments, the gimbal 2 can be controlled to rotate to control the image collection circuit 3 to rotate. Further, the second processing circuit 5 is provided at the gimbal 2. The third processing circuit 6 is provided at the body 1. In some embodiments, how the second processing circuit 5 is fixed at the gimbal 2, and how the third processing circuit 6 is fixed at the body 1 are not limited.

In some embodiments, as shown in FIG. 3, an end of the signal transmission line 4 is connected to the second processing circuit 5. The other end of the signal transmission line 4 is connected to the third processing circuit 6. Transmitting data of the image collection circuit 3 to the first processing circuit 11 may include the second processing circuit 5 encoding a multi-channel first signal output by the image collection circuit 3 to output a second signal, and the third processing circuit 6 receiving the second signal through the signal transmission line 4, decoding the second signal, and transmitting the decoded second signal to the first processing circuit 11. In embodiments of the present disclosure, encoding may refer to combining data of at least two channels, and decoding may refer to recovering the combined data to generate data of multiple channels before being combined. Therefore, the decoded second signal may be the same as the first signal.

In some embodiments, the second processing circuit 5 is added to the gimbal 2, and the third processing circuit 6 is added to the body 1. The multi-channel first signal output by the image collection circuit 3 may be encoded by the second processing circuit 5 and then transmitted to the third processing circuit 6 through the signal transmission line 4. After decoding the received second signal, the third processing circuit 6 may transmit the decoded second signal to the first processing circuit 11. Compared to directly transmitting the multi-channel first signal output by the image collection circuit 3 to the first processing circuit 11 through the signal transmission line 4, the number of the signal transmission line 4 between the body 1 and the gimbal 2 of the present disclosure may be reduced, and the design of the gimbal 2 may be simpler. Further, reducing the number of the signal transmission line 4 may be beneficial for a 360°-free-rotation design for the gimbal 2 and may reduce the product cost. The first processing circuit 11 may be connected to the gimbal 2 by using a connector with fewer ports, which may be beneficial for stabilizing and miniaturing the system.

The first signal may at least include image data collected by the image collection circuit 3. After being processed by the second processing circuit 5 and the third processing circuit 6, the image data collected by the image collection circuit 3 may be returned to the first processing circuit 11. Then, the received image data may be further processed by the first processing circuit 11, for example, compression, conversion, enhancement, storage, etc., so as to satisfy user requirements. In some embodiments, the first processing circuit 11 may include an image processing circuit and/or a storage, and other signal processing circuits. For example, in some embodiments, the first processing circuit 11 may include an image processing circuit. By processing the image data of the decoded second signal, such as compression, conversion, enhancement, etc., the image processing circuit may obtain the image data satisfying the requirements. In some other embodiments, the first processing circuit 11 may include a storage, which may store the decoded second signal. The storage may include a hard disk, a magnet disk, etc. In some other embodiments, the first processing circuit 11 may include an image processing circuit and a storage. The image data of the decoded second signal may be processed by the image processing circuit first, and then the image data processed by the image processing circuit may be saved in the storage. The image data may include video data or pictures. The first signal may not be limited to the image data and may include other signals, for example, operating parameters of the image collection circuit 3.

In embodiments of the present disclosure, the image processing circuit may be a central processing unit (CPU) and/or a hardware chip. The hardware chip may include an application-specific integrated circuit (ASIC), a digital signal processor (DSP), a programmable logic device (PLD), or a combination thereof. The above-described PLD may include a complex programmable logic device (CPLD), a field-programmable gate array (FPGA), a generic array logic (GAL), or any combination thereof.

In some embodiments, the data channel number (number of data channels) of the second signal may be smaller than the data channel number of the first signal. By combining at least two channels of the multi-channel first signal, the second processing circuit 5 may output the second signal with the data channel number smaller than the data channel number of the first signal. When the second signal is transmitted to the third processing circuit 6, the needed number of the signal transmission line 4 may be reduced correspondingly. As such, the cost may be reduced, and the design of the gimbal 2 may be more flexible.

The number of the signal transmission lines 4 may be equal to the data channel number of the second signal. Each channel of the second signal output by the second processing circuit 5 may be transmitted to the third processing circuit 6 by one signal transmission line 4. The signal transmission line 4 may be a long flat line, or a coaxial line, which may be chosen as needed.

The image collection circuit 3 may include a lens and an image sensor cooperating with the lens. By only providing essential components such as the lens, the image sensor, etc., at the gimbal 2, the weight of the gimbal 2 may be reduced, which may be beneficial for the design of the gimbal 2.

In some embodiments, the image collection circuit 3 may include a plurality of first interfaces. The first interfaces may include a clock interface, a reset interface, a setting interface, an image interface, or other signal interfaces. The image collection circuit 3 of the present disclosure may output the first signal through the first interfaces. The setting interface may include a lens communication interface and an image sensor setting interface. The operating parameters of the lens may be controlled through the lens communication interface. The operating parameters of the image sensor may be controlled through the image sensor setting interface. Further, the image sensor may include a complementary metal-oxide-semiconductor (CMOS) image sensor, a charge-coupled device (CCD) image sensor, or other types of image sensors.

The second processing circuit 5 may include a plurality of second interfaces and third interfaces. The second interfaces may each be connected to a corresponding one of the first interfaces. Each first signal may be transmitted to the corresponding second interface through the corresponding first interface. The number of the third interfaces may be equal to the data channel number of the second signal. The second processing circuit 5 of the present disclosure may output the corresponding second signal through the third interface.

The number of the third interfaces may be one or smaller than the number of the first interfaces. The third interface may be a high-speed serial interface. In some embodiments, the second processing circuit 5 may encode the multi-channel first signal to generate a one-channel second signal (e.g., a high-speed serial signal). The second signal may be then output by the third interface, that is, all the received first signals may be combined by the second processing circuit 5 to generate the one-channel high-speed serial signal. As such, the number of the signal transmission line 4 needed by the imaging system may be the least, and the system design may be optimized.

Figure 5:
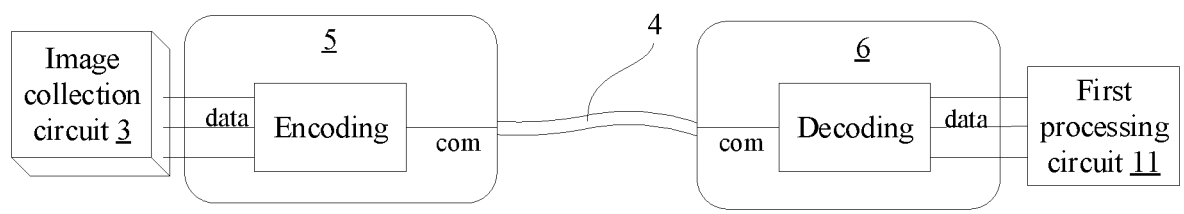
FIG. 5 is a schematic structural diagram showing a part of the imaging system according to some embodiments of the present disclosure.

Correspondingly, the third processing circuit 6 may include one or more fourth interfaces. The number of the fourth interfaces may be equal to the number of the third interfaces. In some embodiments, an end of the signal transmission line 4 may be connected to the third interface. The other end of the signal transmission line 4 may be connected to the fourth interface. That is, the number of the signal transmission lines 4 may be equal to the number of the third interfaces. In some embodiments, as shown in FIG. 5, the third interface and the fourth interface each may be a high-speed serial interface and the system includes one signal transmission line 4. An end of the signal transmission line 4 is connected to the third interface, and the other end of the signal transmission line 4 is connected to the fourth interface. Data of both uplink communication and downlink communication may be transmitted by the signal transmission line 4.

Figure 6:
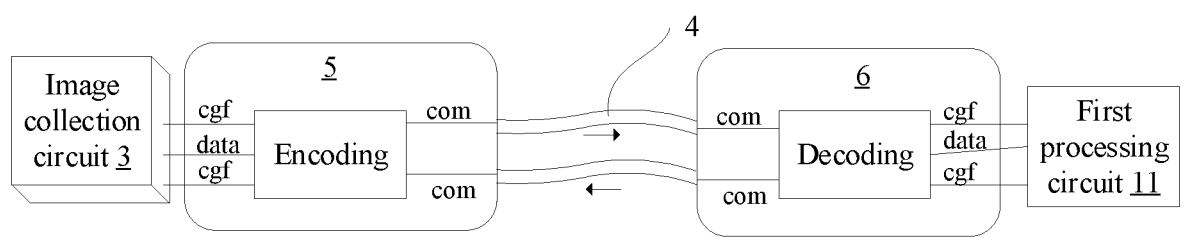
FIG. 6 is a schematic structural diagram showing a part of the imaging system according to some other embodiments of the present disclosure.

In some other embodiments, as shown in FIG. 6, the third interfaces include two high-speed serial interfaces, the fourth interfaces include two high-speed serial interfaces, and the system includes two signal transmission lines 4. The two high-speed serial interfaces of the second processing circuit 5 are connected to the two high-speed serial interfaces of the third processing circuit 6 through the two signal transmission lines 4, respectively. One of the signal transmission lines 4 is configured for the uplink communication (the direction of the data flow of the uplink communication is indicated by the arrow pointing to the right as shown in FIG. 6). The other one of the signal transmission line 4 is configured for the downlink communication (the direction of the data flow of the downlink communication is indicated by the arrow pointing to the left as shown in FIG. 6).

In some embodiments, a communication link of the uplink communication may include the image collection circuit 3→the second processing circuit 5→the signal transmission line 4→the third processing circuit 6→the first processing circuit 11. A communication link of the downlink communication may include the first processing circuit 11→the third processing circuit 6→the signal transmission line 4→the second processing circuit 5→the image collection circuit 3.

Further, the third processing circuit 6 may include a plurality of fifth interfaces. The first processing circuit 11 may include a plurality of sixth interfaces. The number of the fifth interfaces may be equal to the data channel number of the first signal. The plurality of sixth interfaces may be correspondingly connected to the plurality of fifth interfaces. In some embodiments, the types of the fifth interface and the sixth interface may correspond to the type of the first interface. For example, the first interfaces may include a clock interface, a reset interface, a setting interface, and an image interface. Correspondingly, the fifth interfaces and the sixth interfaces each may include a clock interface, a reset interface, a setting interface, and an image interface. The third processing circuit 6 may recover the second signal to the multi-channel first signal and transmit the recovered first signal to the sixth interfaces through the fifth interfaces.

Further, the first processing circuit 11 of embodiments of the present disclosure may control the image collection circuit 3 to operate. In some embodiments, the first processing circuit 11 may receive a clock signal, a reset signal, operating parameters of the lens, operating parameters of the image sensor, etc., transmitted by an external apparatus. The first processing circuit 11 may transmit the received clock signal, reset signal, operating parameters of the lens, and operating parameters of the image sensor, etc., to the third processing circuit 6. The third processing circuit 6 may perform encoding on the received clock signal, reset signal, operating parameters of the lens, operating parameters of the image sensor, etc., to output a third signal. The third signal may be transmitted to the second processing circuit 5 through the signal transmission line 4. Then the second processing circuit 5 may perform decoding on the third signal to recover the clock signal, the reset signal, the operating parameters of the lens, and the operating parameters of the image sensor, etc., which may be transmitted to the corresponding first interfaces to control the image collection circuit 3. In some embodiments, the external apparatus may include a smartphone, a tablet, a desktop, or a computer. In some other embodiments, the external apparatus may further include a remote controller integrated with a touch screen and a control circuit, or may include glasses, a glove, a helmet, a microphone, or a combination thereof controlled by somatosensory or sound. The remote controller may communicate with the first processing circuit 11 through the touch screen or a button of the remote controller without installing an application.

Figure 4:
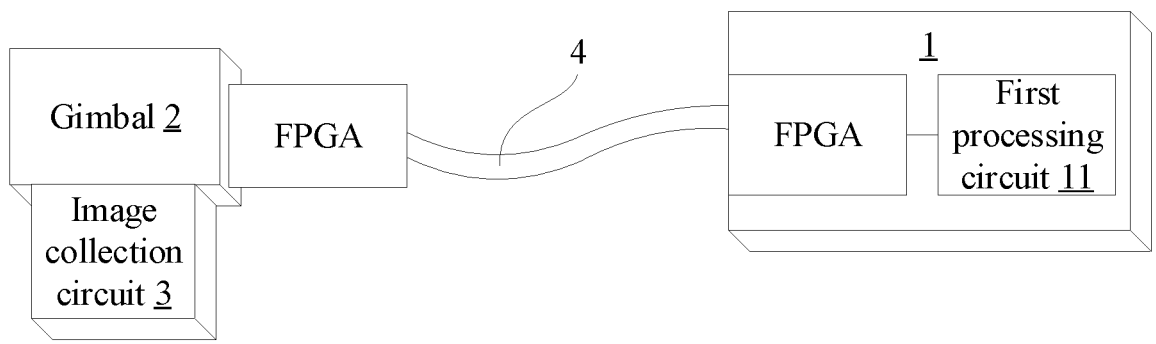
FIG. 4 is a schematic structural diagram showing an imaging system according to some embodiments of the present disclosure.

Further, the types of the second processing circuit 5 and the third processing circuit 6 may be chosen as needed to satisfy different requirements. In some embodiments, the second processing circuit 5 may include an FPGA or ASIC chip. The third processing circuit 6 may include an FPGA or ASIC chip. As shown in FIG. 4, each of the second processing circuit 5 and the third processing circuit 6 includes an FPGA. The third interface and the fourth interface each may be a high-speed serial interface. A bandwidth of the high-speed serial interface of the FPGA may reach several Gbps or even more than ten Gbps. However, a bandwidth of the first interface of a normal image collection circuit 3 (e.g., CMOS) may only have hundreds of Mbps or even tens of Mbps. Therefore, after the encoding of the second processing circuit 5 or the third processing circuit 6, the number of channels of the signal transmission line 4 may be greatly reduced.

To realize the 360°-free-rotation of the gimbal 2 in a yaw direction, the imaging system may include an electrical slip ring. The signal transmission line 4 may include a first signal transmission line 4 and a second signal transmission line 4. An end of the first transmission line 4 may be connected to the second processing circuit 5. The other end of the first transmission line 4 may be connected to the electrical slip ring. An end of the second signal transmission line 4 may be connected to the third processing circuit 6. The other end of the second signal transmission line 4 may be connected to the electrical slip ring away from the end of the first signal transmission line 4. In some embodiments, the exposed signal transmission lines 4 between the gimbal 2 and the body 1 may be integrated into the electrical slip ring to prevent the signal transmission lines 4 from being twisted together. Therefore, a risk of disconnection of the signal transmission lines 4 because of winding is avoided. Further, because the number of signal transmission lines 4 is reduced, the electric slip ring may be designed to be smaller and simpler.

In some embodiments, the gimbal 2 may include a yaw axis and a yaw axis motor. The electrical slip ring may include a housing fixedly connected to the yaw axis and a core part arranged in the housing and rotatably and electrically connected to the housing. An end of the first signal transmission line 4 may be connected to the second processing circuit 5, and the other end of the first signal transmission line 4 may be connected to the housing. An end of the second signal transmission line 4 may be connected to the third processing circuit 6, and the other end of the second signal transmission line 4 may be connected to the core part.

In some embodiments, the housing may be provided with an electric brush facing toward the core part. The core part may be provided with a contact point facing toward the housing. When the gimbal 2 is in operation, the yaw axis motor may rotate. The yaw axis may drive the housing to rotate. However, the core part is stationary. Therefore, the housing may rotate relative to the core part. During the relative rotation between the core part and the housing, the contact point may contact the brush. When the corresponding contract point contacts the brush, the first signal transmission line 4 and the second signal transmission line 4 may conduct to transmit the signal (e.g., the clock signal, the reset signal, the operating parameters of the lens, the operating parameters of the image sensor, etc.). Therefore, the image collection circuit 3 may be controlled to operate.

The imaging system of embodiments of the present disclosure may be a UAV, an unmanned vehicle, or other monitoring apparatus carrying the gimbal 2 and the image collection circuit 3. For example, the imaging system as the UAV is further described.

In some embodiments, the above-described body 1 may be a UAV body. The first processing circuit 11 may be an image processing circuit (such as digital signal processor (DSP), etc.). Directly connecting the image collection circuit 3 and the image processing circuit through the signal transmission line 4 may result in a large number of signal transmission lines between the image collection circuit 3 and the image processing circuit. In some embodiments, by adding the second processing circuit 5 to the gimbal 2 and adding the third processing circuit 6 to the body 1, indirect connection between the image collection circuit 3 and the image processing circuit may be realized. Through re-encoding technology, the number of the signal transmission lines may be reduced, the cost may be thus reduced, and the design of the product may be optimized.

In the present disclosure, relational terms such as first and second are only used to distinguish one entity or operation from another entity or operation and do not necessarily require or imply these entities or operations having such an actual relationship or sequence between them. The terms "include," "contain," or any other variants thereof are intended to cover nonexclusive inclusion, so that a process, method, article, or device including a series of elements includes not only those elements, but also other elements not explicitly listed, or also include elements inherent to such processes, methods, articles, or device. If there are no more restrictions, the element defined by the sentence "including a . . . " does not exclude the existence of another same element in the process, method, article, or device including the element.

The imaging system provided by embodiments of the present disclosure is described in detail above, and specific examples are used in the specification to illustrate the principles and implementation of the present disclosure. The description of the above embodiments is only used to help understand the method of the present disclosure and its core ideas. At the same time, for those of ordinary skill in the art, according to the ideas of the present disclosure, changes may be made to specific implementation and application scope. In summary, the content of this specification should not be construed as a limitation to the present disclosure.

What is claimed is:

1. An imaging system comprising:
 a body;
 a first processing circuit provided at the body;
 a gimbal carried by the body;
 an image collection circuit carried by the gimbal;
 a second processing circuit provided at the gimbal;
 a third processing circuit provided at the body; and
 a signal transmission line, one end of the signal transmission line being connected to the second processing circuit and another end of the signal transmission line being connected to the third processing circuit;
 wherein:
  the second processing circuit is configured to encode a multi-channel first signal output by the image collection circuit to output a second signal; and
  the third processing circuit is configured to receive the second signal through the signal transmission line, decode the second signal to obtain a decoded second signal, and transmit the decoded second signal to the first processing circuit.

2. The imaging system of claim 1, wherein a data channel number of the second signal is smaller than a data channel number of the first signal.

3. The imaging system of claim 2, wherein:
 the signal transmission line is one of one or more signal transmission lines coupled between the second processing circuit and the third processing circuit; and
 a number of the one or more signal transmission lines is equal to the data channel number of the second signal.

4. The imaging system of claim 1, wherein:
 the image collection circuit includes a plurality of interfaces, including a clock interface, a reset interface, a setting interface, and an image interface; and
 the first signal includes image data collected by the image collection circuit.

5. The imaging system of claim 4, wherein:
 the image collection circuit includes a lens and an image sensor cooperating with the lens; and
 the setting interface includes a lens communication interface and an image sensor setting interface.

6. The imaging system of claim 5, wherein the image sensor includes a complementary metal-oxide-semiconductor (CMOS) image sensor.

7. The imaging system of claim 4, wherein:
 the plurality of interfaces are a plurality of first interfaces;
 the second processing circuit includes a plurality of second interfaces and one or more third interfaces;
 each of the second interfaces is connected to a corresponding one of the first interfaces;
 data in each channel of the first signal is transmitted to a corresponding one of the second interfaces through a corresponding one of the first interfaces; and
 a number of the one or more third interfaces is equal to a data channel number of the second signal.

8. The imaging system of claim 7, wherein:
 the third processing circuit includes one or more fourth interfaces;
 a number of the one or more fourth interfaces is equal to the number of the one or more third interfaces; and
 the one end of the signal transmission line is connected to one of the one or more third interfaces, and the other end of the signal transmission line is connected to one of the one or more fourth interfaces.

9. The imaging system of claim 8, wherein:
 the one or more third interfaces include a first high-speed serial interface;
 the one or more fourth interfaces includes a second high-speed serial interface; and
 the signal transmission line is coupled between the first high-speed serial interface and the second high-speed serial interface.

10. The imaging system of claim 8, wherein:
 the one or more third interfaces include two first high-speed serial interfaces;

the one or more fourth interfaces include two second high-speed serial interfaces;

the signal transmission line is one of two signal transmission lines of the imaging system; and each of the two first high-speed serial interfaces is connected to a corresponding one of the two second high-speed serial interfaces through a corresponding one of the two signal transmission lines.

11. The imaging system of claim 8, wherein:

the third processing circuit includes a plurality of fifth interfaces;

a number of the fifth interfaces is equal to a data channel number of the first signal;

the first processing circuit includes a plurality of sixth interfaces;

the plurality of sixth interfaces are connected to the plurality of fifth interfaces correspondingly; and the third processing circuit is configured to recover the multi-channel first signal from the second signal and transmit the recovered first signal to the plurality of sixth interfaces through the plurality of fifth interfaces.

12. The imaging system of claim 1, wherein the second processing circuit includes a field-programmable gate array (FPGA) or an application-specific integrated circuit (ASIC) chip.

13. The imaging system of claim 1, wherein the third processing circuit includes a field-programmable gate array (FPGA) or an application-specific integrated circuit (ASIC) chip.

14. The imaging system of claim 1, further comprising:

an electrical slip ring;

wherein:

the signal transmission line includes a first transmission line and a second transmission line;

one end of the first transmission line is connected to the second processing circuit, and the other end of the first transmission line is connected to a first side of the electrical slip ring; and one end of the second transmission line is connected to the third processing circuit, and the other end of the second transmission line is connected to a second side of the electrical slip ring that is away from the first side.

15. The imaging system of claim 1, wherein the first processing circuit includes at least one of an image processing circuit or a storage.

16. The imaging system of claim 1, wherein:

the imaging system includes an unmanned aerial vehicle (UAV);

the body includes a body of the UAV; and the first processing circuit includes an image processing circuit.

17. The imaging system of claim 1, wherein the imaging system includes an unmanned vehicle.

* * * * *